(12) United States Patent
Mizuno

(10) Patent No.: US 7,908,503 B2
(45) Date of Patent: Mar. 15, 2011

(54) METHOD OF SAVING POWER CONSUMED BY A STORAGE SYSTEM

(75) Inventor: Yoichi Mizuno, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 486 days.

(21) Appl. No.: 12/153,925

(22) Filed: May 28, 2008

(65) Prior Publication Data

US 2008/0244295 A1    Oct. 2, 2008

Related U.S. Application Data

(63) Continuation of application No. 11/292,004, filed on Dec. 2, 2005, now abandoned.

(30) Foreign Application Priority Data

Oct. 3, 2005    (JP) ................................. 2005-289941

(51) Int. Cl.
*G06F 1/00*        (2006.01)
*G06F 13/00*      (2006.01)

(52) U.S. Cl. ......................................... 713/324; 711/112
(58) Field of Classification Search .......... 713/300–340; 711/111–114

See application file for complete search history.

(56) References Cited

U.S. PATENT DOCUMENTS

| | | | |
|---|---|---|---|
| 6,157,984 A | 12/2000 | Fisher et al. | |
| 6,247,099 B1 * | 6/2001 | Skazinski et al. | 711/141 |
| 6,330,642 B1 * | 12/2001 | Carteau | 711/114 |
| 6,583,947 B1 | 6/2003 | Hakamata et al. | |
| 6,601,187 B1 * | 7/2003 | Sicola et al. | 714/6 |
| 6,859,882 B2 * | 2/2005 | Fung | 713/300 |
| 6,886,074 B1 * | 4/2005 | Narayanaswamy et al. | 711/114 |
| 7,076,607 B2 | 7/2006 | Miwa et al. | |
| 7,185,227 B2 | 2/2007 | Eguchi et al. | |
| 7,219,202 B2 | 5/2007 | Satoyama et al. | |
| 2003/0212859 A1 * | 11/2003 | Ellis et al. | 711/114 |
| 2005/0268057 A1 | 12/2005 | Satoyama et al. | |
| 2007/0073970 A1 * | 3/2007 | Yamazaki et al. | 711/114 |

FOREIGN PATENT DOCUMENTS

| | | |
|---|---|---|
| JP | 2003223289 | 8/2003 |
| JP | 2004252686 | 9/2004 |
| JP | 2005018185 | 1/2005 |
| JP | 2005165694 | 6/2005 |

OTHER PUBLICATIONS

C. Weddle "PARAID: The Gear-Shifting Power-Aware RAID", the Florida State University, [Online], Jun. 2005, [Jun. 7, 2010], pp. 1-71.

* cited by examiner

*Primary Examiner* — Paul R Myers
(74) *Attorney, Agent, or Firm* — Brundidge & Stanger, P.C.

(57) ABSTRACT

Provided is a method of saving power consumed by a storage system that is connected to a host computer via a network, including a disk device for storing to be written data requested by the host computer, and controllers that control access to the disk device, in which the controllers each have an interface connected to the network, a processor connected to the interface, and a memory connected to the processor, in which the processor measures a load of the storage system, and in which the processor controls power to the controllers in accordance with the measured load of the storage system.

12 Claims, 14 Drawing Sheets

| POWER SAVING MODE NUMBER | OPERATION DETAILS 1111A | | | | 1111B |  |
|---|---|---|---|---|---|---|
|  | CPU | CACHE MEMORY | HOST COMPUTER IF | DISK IF | VARIOUS BUSES | ... |
| 0 | ALL IN OPERATION | ALL IN OPERATION | ALL IN OPERATION | ALL IN OPERATION | ALL IN OPERATION |  |
| 1 | REDUCED CLOCK | REDUCED CLOCK | LOWERED SPEED | LOWERED SPEED | REDUCED CLOCK |  |
| 2 | REDUCED CORE COUNT | — | REDUCED PORT COUNT | REDUCED LINK COUNT | — |  |
| 3 | REDUCED CPU COUNT | — | REDUCED IF COUNT | REDUCED IF COUNT | — |  |
| 4 | ALL OUT OF OPERATION | ALL OUT OF OPERATION | ALL OUT OF OPERATION | ALL OUT OF OPERATION | ALL OUT OF OPERATION |  |

MODE MANAGEMENT TABLE 1111

FIG. 4

| POWER SAVING MODE NUMBER | OPERATION CONDITIONS 1112A | | | | | |
|---|---|---|---|---|---|---|
| | CPU | CACHE MEMORY | HOST COMPUTER IF | DISK IF | VARIOUS BUSES | ... |
| 0 | ACTIVITY RATIO 60%~ / ... | ACTIVITY RATIO 50%~ / ... | PERFORMANCE 70%~ / ... | PERFORMANCE 80%~ / ... | PERFORMANCE 50%~ / ... | |
| 1 | 40~60% / ... | ~50% / ... | 40~70% / ... | 50~80% / ... | ~50% / ... | |
| 2 | 20~40% ... | — | 20~40% / ... | 30~50% / ... | — | |
| 3 | ~20% / ... | — | ~20% / ... | ~30% / ... | — | |
| 4 | 0% / ... | 0% / ... | 0% / ... | 0% / ... | 0% / ... | |

THRESHOLD MANAGEMENT TABLE 1112

*FIG. 5*

| OPERATING CTL COUNT | OPERATION CONDITIONS | | ... |
| --- | --- | --- | --- |
| | RANDOM PERFORMANCE(IOPS) 1116A | SEQUENTIAL PERFORMANCE(MB/s) 1116B | |
| 0 | — | — | |
| 1 | 0~25% | 0~25% | |
| 2 | 25~50% | 25~50% | |
| 3 | 50~75% | 50~75% | |
| 4 | 75~100% | 75~100% | |

1116

CONTROLLER COUNT CONTROL TABLE

FIG. 8

| POWER SAVING MODE NUMBER | OPERATION CONDITIONS | | ... |
|---|---|---|---|
| | RANDOM PERFORMANCE(IOPS) | SEQUENTIAL PERFORMANCE (MB/s) | |
| 0 | 70%~ | 80%~ | |
| 1 | 50~70% | 60~80% | |
| 2 | 20~50% | 30~60% | |
| 3 | ~20% | ~30% | |
| 4 | 0% | 0% | |

HOST COMPUTER SIDE THRESHOLD MANAGEMENT TABLE

FIG. 13

METHOD OF SAVING POWER CONSUMED BY A STORAGE SYSTEM

CROSS-REFERENCES

This is a continuation application of U.S. Ser. No. 11/292,004, filed Dec. 2, 2005 now abandoned.

CLAIM OF PRIORITY

The present application claims priority from Japanese patent application P2005-289941 filed on Oct. 3, 2005, the content of which is hereby incorporated by reference into this application.

BACKGROUND

This invention relates to a storage system that receives a write request from a host computer and more specifically to a technique for reducing power consumption of the storage system.

Storage systems are increasingly becoming larger and larger in terms of storage area capacity. Such large-scale storage systems have problems of increased power consumption and increased heat generation.

As a countermeasure, techniques for reducing power consumption of storage systems have been disclosed (see JP 2000-293314 A, for example). A storage system according to JP 2000-293314 A cuts off the power to a disk device which has not been accessed by a host computer for a given period of time. The storage system thus reduces power consumption of a disk device that is not being accessed by a host computer.

SUMMARY

The prior art described above enables a storage system to reduce power consumption of a disk device, but not the power consumption of a controller that controls access to the disk device. In other words, conventional controllers for a storage system have a problem of keeping consuming power even when the storage system is not being accessed by a host computer.

Also, conventionally, storage systems run all controllers even when a load is far smaller than their processing abilities. Conventional storage systems thus have a problem of constantly consuming a given amount of power irrespective of the magnitude of the load.

This invention has been made in view of the above, and it is therefore an object of this invention to reduce power consumption of a storage system.

According to an embodiment of this invention, there is provided a method of saving power consumed by a storage system that is connected to a host computer via a network, including a disk device for storing to be written data requested by the host computer, and controllers that control access to the disk device, in which the controllers each have an interface connected to the network, a processor connected to the interface, and a memory connected to the processor, in which the processor measures a load of the storage system, and in which the processor controls power to the controllers in accordance with the measured load of the storage system.

According to the embodiment of this invention described above, the reduction of the power consumption of the storage system can be attained.

BRIEF DESCRIPTION OF THE DRAWINGS

The present invention can be appreciated by the description which follows in conjunction with the following figures, wherein:

FIG. 4 is a configuration diagram of a mode management table, which is included in the controller according to the first embodiment of this invention;

FIG. 5 is a configuration diagram of a threshold management table, which is included in the controller according to the first embodiment of this invention;

FIG. 8 is a configuration diagram of a controller count control table, which is included in the controller according to the second embodiment of this invention;

FIG. 13 is a configuration diagram of a host computer-side threshold management table, which is included in a host computer according to the fourth embodiment of this invention.

DETAILED DESCRIPTION OF THE PREFERRED EMBODIMENTS

Embodiments of this invention will be described below with reference to the accompanying drawings.

First Embodiment

Figure 1:
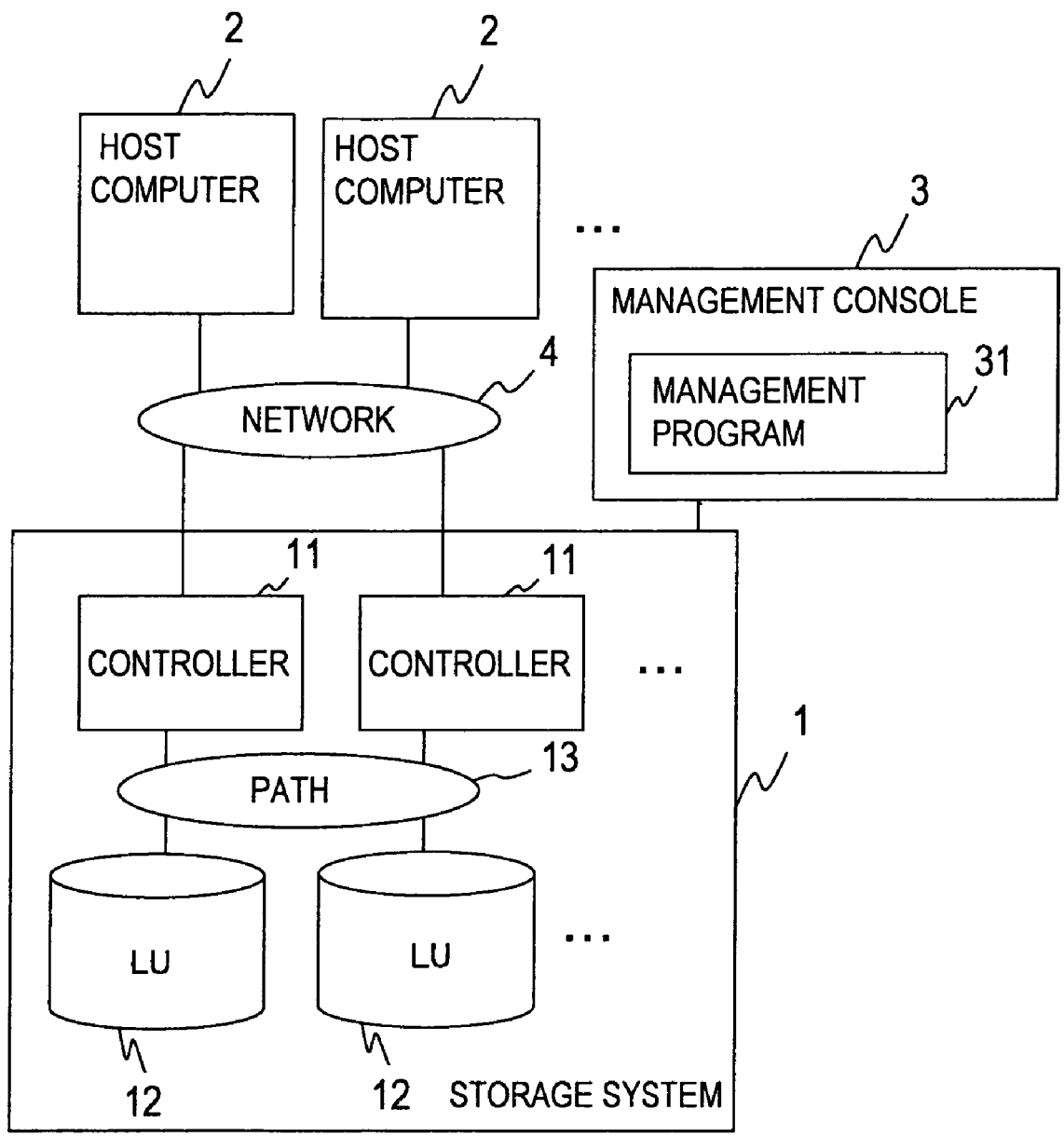
FIG. 1 is a block diagram of a computer system according to a first embodiment of this invention.

FIG. 1 is a block diagram of a computer system according to a first embodiment of this invention.

The computer system includes a storage system 1, a host computer 2, a management console 3 and a network 4.

The host computer 2 is a computer equipped with a CPU, a memory, and an interface. The host computer 2 executes programs stored in the memory, to thereby execute various types of processing. For example, the host computer 2 stores data in the storage system 1.

The storage system 1 has a controller 11, a disk device, and a path 13. The controller 11 controls, as will be described later with reference to FIG. 2, the storage system 1. The controller 11 also inputs and outputs data to and from the disk device. The disk device stores data sent from the host computer. The path 13 connects the controller 11 and the disk device to each other.

The host computer 2 recognizes the storage area of the disk device on a logical volume (LU) basis. One or more LUs, which are denoted by 12, are built in the storage system 1.

The management console 3 is a computer equipped with a CPU, a memory, and an interface. The management console 3 executes programs stored in the memory, to thereby execute various types of processing. One of the programs stored in the memory of the management console 3 is a management program 31. The management console 3 executes the management program 31 stored in the memory to manage the storage system 1.

The management console 3 is connected to the storage system 1 via, for example, a LAN. The management console 3 which, in this block diagram, is connected directly to the storage system 1, may be connected via the network 4 to the storage system 1.

The network 4 is, for example, a SAN (Storage Area Network), and connects the storage system 1 to the host computer 2.

Figure 2:
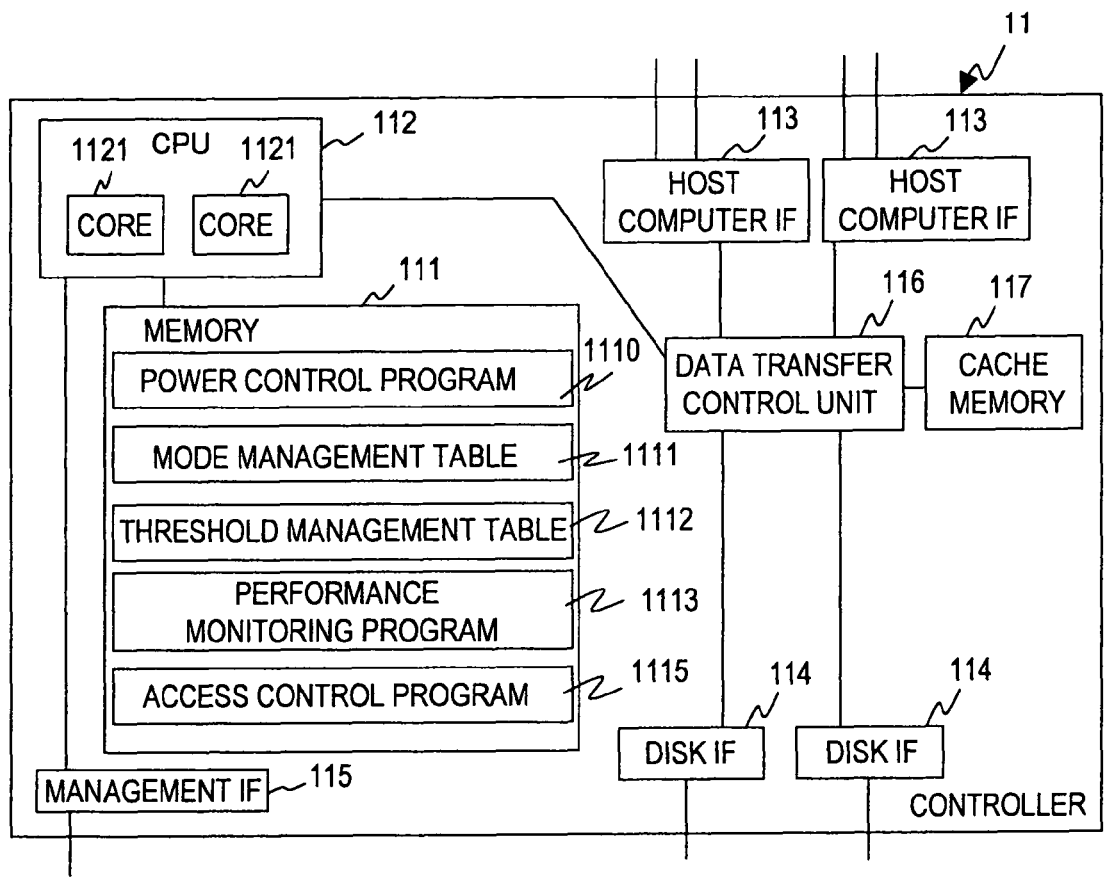
FIG. 2 is a block diagram of a controller of the storage system according to the first embodiment of this invention.

FIG. 2 is a block diagram of the controller 11 of the storage system 1 according to the first embodiment of this invention.

The controller 11 has a memory 111, a CPU 112, a host computer interface (host computer IF) 113, a disk interface (disk IF) 114, a management interface (management IF) 115, a data transfer control unit 116 and a cache memory 117.

The memory 111 stores a power control program 1110, a mode management table 1111, a threshold management table 1112, a performance monitoring program 1113 and an access control program 1115.

The power control program 1110 controls the power of the controller 11. The power control program 1110 also causes the controller 11 to switch from one power saving mode to another. A power saving mode is a mode of operation adjusted to reduce power consumption of the controller 11.

The mode management table 1111 manages, as will be described later with reference to FIG. 4, the association between a power saving mode of the controller 11 and how the components of the controller 11 operates. The threshold management table 1112 manages, as will be described later with reference to FIG. 5, the association between a power saving mode of the controller 11 and the magnitude of the load applied to the components of the controller 11.

The performance monitoring program 1113 monitors the load of the storage system 1.

The access control program 1115 controls access to the LUs 12. For instance, the access control program 1115 changes which of the controllers 11 accesses the LUs 12.

The CPU 112 executes programs stored in the memory 111, to thereby execute various types of processing. The CPU 112 has one or more cores 1121. The core 1121 is an arithmetic circuit. The more cores 1121 the CPU 112 has, the more data the CPU 112 can process. The controller 11 shown in FIG. 2 has one CPU 112, but may have plural CPUs 112.

The host computer IF 113 is an interface connected to the host computer 2. The controller 11 shown in FIG. 2 has two host computer IFs 113, but may have as many host computer IFs 113 as necessary. Each host computer IF 113 has one or more ports.

The disk IF 114 is an interface connected to the disk device. The controller 11 shown in FIG. 2 has two disk IFs 114, but may have as many disk IFs 114 as necessary. Each disk IF 114 has one or more ports.

The management IF 115 is an interface connected to the management console 3.

Examples of interfaces that are employable as the host computer IF 113, the disk IF 114 and the management IF 115 include Fibre Channel, SCSI (Small Computer System Interface), iSCSI (Internet Small Computer System Interface), Infiniband, SATA (Serial ATA), and SAS (Serial Attached SCSI).

The cache memory 117 temporarily stores data sent from the host computer 2. Having the cache memory 117, the controller 11 can access the LUs 12 at high speed. The cache memory 117 may be a part of the storage area of the memory 111.

The data transfer control unit 116 controls data transfer among the CPU 112, the host computer IF 113, the disk IF 114 and the cache memory 117. An LSI, for example, can serve as the data transfer control unit 116.

Next, a configuration for the controller 11 that is different from the one shown in FIG. 2 will be described.

Figure 3:
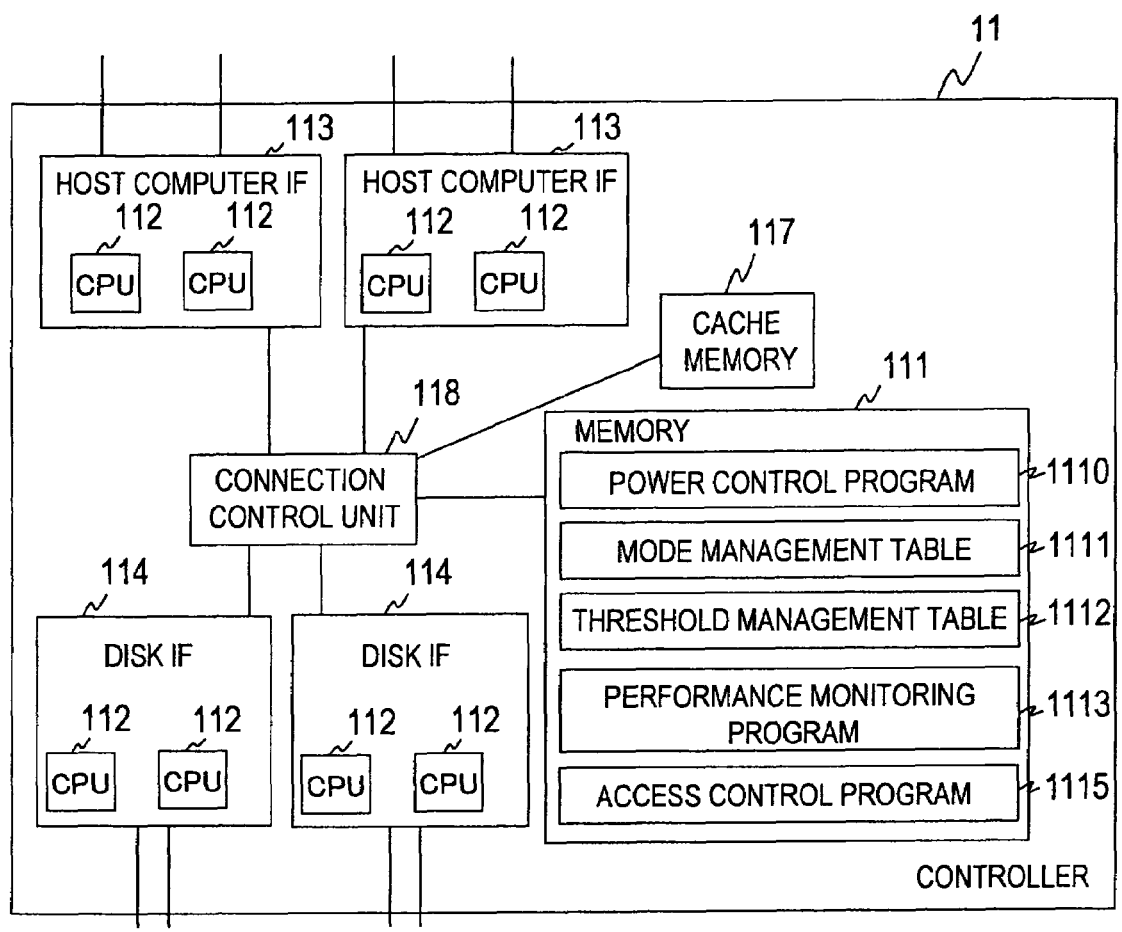
FIG. 3 is a block diagram of the controller of the storage system according to the first embodiment of this invention.

FIG. 3 is a block diagram of the controller 11 of the storage system 1 according to the first embodiment of this invention.

The control 11 shown in FIG. 3 is a modified example of the controller 11 shown in FIG. 2. The storage system 1 of this embodiment can have either the controller 11 of FIG. 2 or the controller 11 of FIG. 3.

In the controller 11 of FIG. 3, the host computer IF 113 and the disk IF 114 each have the CPU 112. Another difference is that a connection control unit 118 controls data transfer among the memory 111, the host computer IF 113, the disk IF 114 and the cache memory 117. This way the memory 111 and the cache memory 117 are shared by all the CPUs 112.

The rest of the configuration of the controller 11 shown in FIG. 3 is the same as that of the controller 11 shown in FIG. 2, and therefore will not be described here.

Whichever of the two configurations, one illustrated in FIG. 2 and the other illustrated in FIG. 3, the controller 11 takes, power consumption is reduced by the same processing.

FIG. 4 is a configuration diagram of the mode management table 1111 in the controller 11 according to the first embodiment of this invention.

The mode management table 1111 includes a power saving mode number 1111A and operation details 1111B.

The power saving mode number 1111A indicates an identifier unique to each power saving mode of the controller 11. The operation details 1111B describe how the components of the controller 11 operate in this particular power saving mode identified by the power saving mode number 1111A.

The mode management table 1111 shown in this configuration diagram includes information concerning the CPU 112, the cache memory 117, the host computer IF 113, the disk IF 114, and various buses.

First, a description of power saving modes will be given focusing on the CPU 112 in the controller 11.

When the power saving mode number 1111A is "0", every CPU 112 in the controller 11 uses all of its resources and operates at its highest possible drive frequency and maximum possible drive voltage.

When the power saving mode number 1111A is "1", the CPU 112 operates at a given drive frequency that is lower than the highest possible drive frequency. When the power saving mode number 1111A is "2", the CPU 112 operates while running only a given reduced count of cores 1121. When the power saving mode number 1111A is "3", a given count of CPUs 112 in the controller 11 stop operating. When the power saving mode number 1111A is "4", all of the CPUs 112 in the controller 11 stop operating.

Additionally, the drive frequency of the CPU 112 may be changed in stages in accordance with switching made from one power saving mode to another.

A power saving mode may be defined by the combination of how much change is made to the drive frequency of the CPU 112 and how much change is made to the count of operating CPUs 112. Similarly, a power saving mode may be defined by the combination of how much change is made to the drive frequency of the CPU 112 and how much change is made to the count of operating cores 1121.

Next, a description on power saving modes will be given focusing on the cache memory 117 in the controller 11. When the power saving mode number 1111A is "0", the cache memory 117 operates at its highest possible drive frequency.

When the power saving mode number 1111A is "1", the cache memory 117 operates at a given drive frequency that is lower than the highest possible drive frequency. When the power saving mode number 1111A is "4", the cache memory 117 stops operating.

The drive frequency of the cache memory 117 may be changed in stages in accordance with switching made from one power saving mode to another.

Next, a description on power saving modes will be given focusing on the host computer IF 113 in the controller 11. When the power saving mode number 1111A is "0", every host computer IF 113 in the controller 11 uses all of its resources and operates at its highest possible transfer rate.

When the power saving mode number 1111A is "1", the host computer IF 113 operates at a given transfer rate that is lower than the highest possible transfer rate.

When the power saving mode number 1111A is "2", the host computer IF 113 operates while reducing the count of operating ports to a given count.

Specifically, the CPU 112 searches ports operating in the host computer IF 113 for ports to which no LUs 12 are allocated. In other words, the CPU 112 searches for ports that are not being used by the host computer 2. In the case where the CPU 112 cannot find ports that are not being used by the host computer 2, allocation of the LUs 12 to ports is changed to create ports that are not available for use by the host computer 2. The CPU 112 then shuts off power to the ports that are not being used by the host computer 2.

When the power saving mode number 1111A is "3", a given count of the host computers IF 113 in the controller 11 stop operating.

Specifically, the CPU 112 searches host computer IF 113 in the controller 11 for ports to which no LUs 12 are allocated. In other words, the CPU 112 searches for host computer IF 113 that are not being used by the host computer 2. In the case where the CPU 112 cannot find host computer IF 113 that are not being used by the host computer 2, allocation of the LUs 12 to ports is changed to create host computer IF 113 that are not available for use by the host computer 2. The CPU 112 then shuts off power to the host computer IF 113 that are not being used by the host computer 2.

When the power saving mode number 1111A is "4", every host computer IF 113 in the controller 11 stops operating. Specifically, the CPU 112 shuts off power to every host computer IF 113 in the controller 11.

Next, a description on power saving modes will be given focusing on the disc IF 114 in the controller 11. When the power saving mode number 1111A is "0", every the disc IF 114 in the controller 11 operates at its highest possible drive frequency by using all its links.

When the power saving mode number 1111A is "1", the disc IF 114 operates at a given drive frequency that is lower than the highest possible drive frequency.

When the power saving mode number 1111A is "2", the disc IF 114 reduces the number of links of transmission circuits to a predetermined number and operates.

Specifically, the CPU 112 searches links in the disk IF 114 for links that are connected to only inactive disk devices. The CPU 112 then shuts off power to the found links.

When the power saving mode number 1111A is "3", a given number of the disk IFs 114 in the controller 11 stops operating.

Specifically, the CPU 112 searches disk IF 114 in the disk IF 114 that are connected to only inactive disk devices. The CPU 112 then shuts off power to the found disk IF 114.

When the power saving mode number 1111A is "4", every disc IF 114 in the controller 11 stops operating. Specifically, the CPU 112 shuts off power to every disc IF 114 in the controller 11.

Next, a description on power saving modes will be given focusing on the buses in the controller 11. When the power saving mode number 1111A is "0", the data transfer control unit 116 in the controller 11 operates at its highest possible drive frequency. This raises the data transfer rate of the buses in the controller 11 to the maximum.

When the power saving mode number 1111A is "1", the data transfer control unit 116 operates at a given drive frequency that is lower than the highest possible drive frequency. This lowers the data transfer rate of the buses in the controller 11.

When the power saving mode number 1111A is "4", the data transfer control unit 116 stops operating.

A power saving mode may be defined by combining the operation details mentioned above.

FIG. 5 is a configuration diagram of the threshold management table 1112 in the controller 11 according to the first embodiment of this invention.

The threshold management table 1112 includes a power saving mode number 1112A and operation conditions 1112B.

The power saving mode number 1112A indicates an identifier unique to each power saving mode of the controller 11. The operation conditions 1112B describe conditions that the components of the controller 11 fulfill in this particular power saving mode identified by the power saving mode number 1112A. Specifically, the magnitude of the load applied to the controller 11 and like other conditions are stored as the operation conditions 1112B.

When the activity ratio of the CPU 112 is more than 60%, the CPU 112 operates in a power saving mode that has a power saving mode number "0" as the power saving mode number 1112A. When the activity ratio of the CPU 112 is more than 40% and less than 60%, the CPU 112 operates in a power saving mode that has a power saving mode number "1" as the power saving mode number 1112A.

When the activity ratio of the CPU 112 is 20% or more and less than 40%, the CPU 112 operates in a power saving mode that has a power saving mode number "2" as the power saving mode number 1112A. When the activity ratio of the CPU 112 is more than 0% and less than 20%, the CPU 112 operates in a power saving mode that has a power saving mode number "3" as the power saving mode number 1112A. When the activity ratio of the CPU 112 is 0%, the CPU 112 operates in a power saving mode that has a power saving mode number "4" as the power saving mode number 1112A.

Alternatively, a power saving mode in terms of the CPU 112 in the threshold management table 1112 may be defined by other thresholds than the activity ratio of the CPU 112, for example, the data processing rate of the controller 11.

When the activity ratio of the cache memory 117 is more than 50%, the cache memory 117 operates in a power saving mode that has a power saving mode number "0" as the power saving mode number 1112A. When the activity ratio of the cache memory 117 is more than 0% and less than 50%, the cache memory 117 operates in a power saving mode that has a power saving mode number "1" as the power saving mode number 1112A. When the activity ratio of the cache memory 117 is 0%, cache memory 117 operates in a power saving mode that has a power saving mode number "4" as the power saving mode number 1112A.

Alternatively, a power saving mode in terms of the cache memory 117 in the threshold management table 1112 may be defined by other thresholds than the activity ratio of the cache memory 117, for example, the data processing rate of the controller 11.

In this threshold management table 1112, a power saving mode in terms of the host computer IF 113 is defined in accordance with the proportion of the maximum data transfer rate (data transferring ability) of the host computer IF 113 to the data processing rate of the controller 11.

A case in which the controller 11 has four host computer IFs 113 will be described as an example. The four host computer IFs 113 each has a data transfer ability of 1 GB/s. Accordingly, the combined data transfer ability of all the host computer IFs 113 in the controller 11 is 4 GB/s. The data processing rate of the controller 11 in a certain period of time is 1 GB/s, meaning that only 25% of the combined data transfer ability of the four host computer IFs 113 is put to use. Therefore, it is sufficient that one out of the four host computer IFs 113 operates. In other words, the controller 11 can afford to stop the remaining three host computer IFs 113 from operating.

To a power saving mode entailing these details, a user assigns a power saving mode number "3". The user then enters information about this power saving mode in the mode management table 1111 and the threshold management table 1112.

Specifically, a record having "3" as the power saving mode number 1112A is picked up from the threshold management table 1112, and "25% or less" is stored in a host computer IF cell of the operation conditions 1112B of the chosen record.

Next, a record having "3" as the power saving mode number 1111A is picked up from the mode management table 1111, and "IF count=1" is stored in a host computer IF cell of the operation details 1111B of the chosen record.

With the power saving mode thus defined, the CPU 112 shuts off power to three of the host computer IFs 113 when the proportion of the combined data transfer ability of all the host computer IFs 113 to the data processing rate of the controller 11 becomes 25% or less.

Alternatively, a power saving mode in terms of the host computer IF 113 in the threshold management table 1112 may be defined by other thresholds such as the activity ratio of the host computer IF 113.

A power saving mode in the threshold management table 1112 is defined in terms of the disk IF 114 and the various buses in addition to the host computer IF 113.

Having the threshold management table 1112 as this, the controller 11 can change the count of operating components, such as host computer IFs and disk IFs, to suit the current data processing rate.

Two types of thresholds, one for an increase in power consumption and the other for a reduction in power consumption, may be defined in the threshold management table 1112. This enables the controller 11 to deal with rapid changes in data processing amount.

In the mode management table 1111 and the threshold management table 1112, a power saving mode is defined in terms of the host computer IF 113 and in terms of the disk IF 114 separately. This is because the host computer IF 113 does not always need the same data transfer rate as the disk IF 114. The separate definition enables the controller 11 to stop some of the disk IFs 114 from operating while running all of the host computer IFs 113. Similarly, it enables the controller 11 to stop some of the host computer IFs 113 from operating while running all of the disk IFs 114. In short, the controller 11 can shut off power to one type of interface independently of another type of interface, and power consumption can thus be reduced even more.

Figure 6:
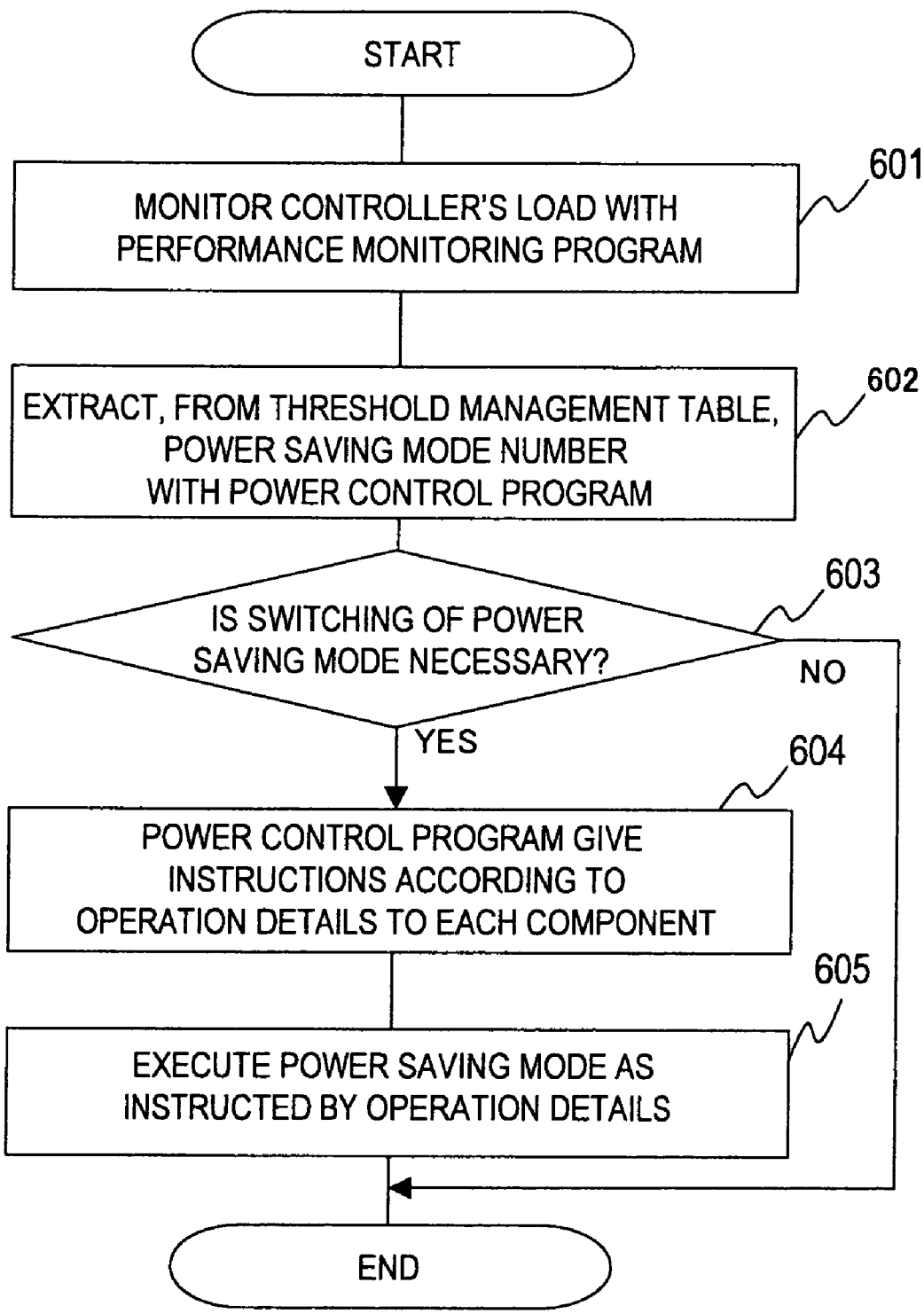
FIG. 6 is a flow chart for power saving mode switching processing of the controller according to the first embodiment of this invention.

FIG. 6 is a flow chart for power saving mode switching processing of the controller 11 according to the first embodiment of this invention.

The controller 11 periodically performs the power saving mode switching processing.

The performance monitoring program 1113 periodically measures the load of the controller 11 (Step 601). Specifically, the performance monitoring program 1113 measures loads listed as the operation conditions 1112B in the threshold management table 1112. For example, in the case where the controller 11 has the threshold management table as shown in FIG. 5, the performance monitoring program 1113 measures the activity ratio of the CPU 112, the activity ratio of the cache memory 117, and the data processing rate of the controller 11.

Then the power control program 1110 chooses from the threshold management table 1112 a record entry whose operation conditions 1112B match the results of the measurement by the performance monitoring program 1113. From the chosen record entry, the power saving mode number 1112A is extracted (Step 602). The power control program 1110 extracts the power saving mode number 1112A for each component of the controller 11.

The extracted power saving mode number 1112A is compared with a power saving mode number that is currently set to each component of the controller 11, to thereby judge whether or not the power saving mode set to the component needs to be switched to another power saving mode (Step 603). The power control program 1110 judges, for each component of the controller 11, whether to switch power saving modes.

Judging that there is no need to switch power saving modes, the power control program 1110 ends the power saving mode switching processing.

On the other hand, when it is judged that the current power saving mode has to be switched, a switch is made to another power saving mode. Specifically, the power control program 1110 chooses from the mode management table 1111 a record entry whose power saving mode number 111A matches the extracted power saving mode number 1112A. From the chosen record entry, the operation details 1111B are extracted. The power control program 1110 then gives instructions to the components of the controller 11 in accordance with the extracted operation details 1111B (Step 604).

Receiving the instructions, the components of the controller 11 perform processing corresponding to the operation details 1111B, to thereby execute their respective power saving modes (Step S605).

The controller 11 thus switches power saving modes in accordance with the magnitude of the load.

The power control program 1110 sets different power saving modes to different types of component of the controller 11, but may set the same power saving mode to every component of the controller 11. In this case, the power control program 1110 chooses the smallest one out of the power saving mode numbers selected as the power saving mode number 1112A in Step S602. The chosen power saving mode number is set to every component of the controller 11.

Second Embodiment

In a second embodiment, the storage system 1 changes the number of operating controllers 11 in accordance with the magnitude of the load.

A computer system of the second embodiment has the same configuration as the computer system of the first embodiment shown in FIG. 1, except the controller 11. A description on the common part of the configuration will be omitted here.

Figure 7:
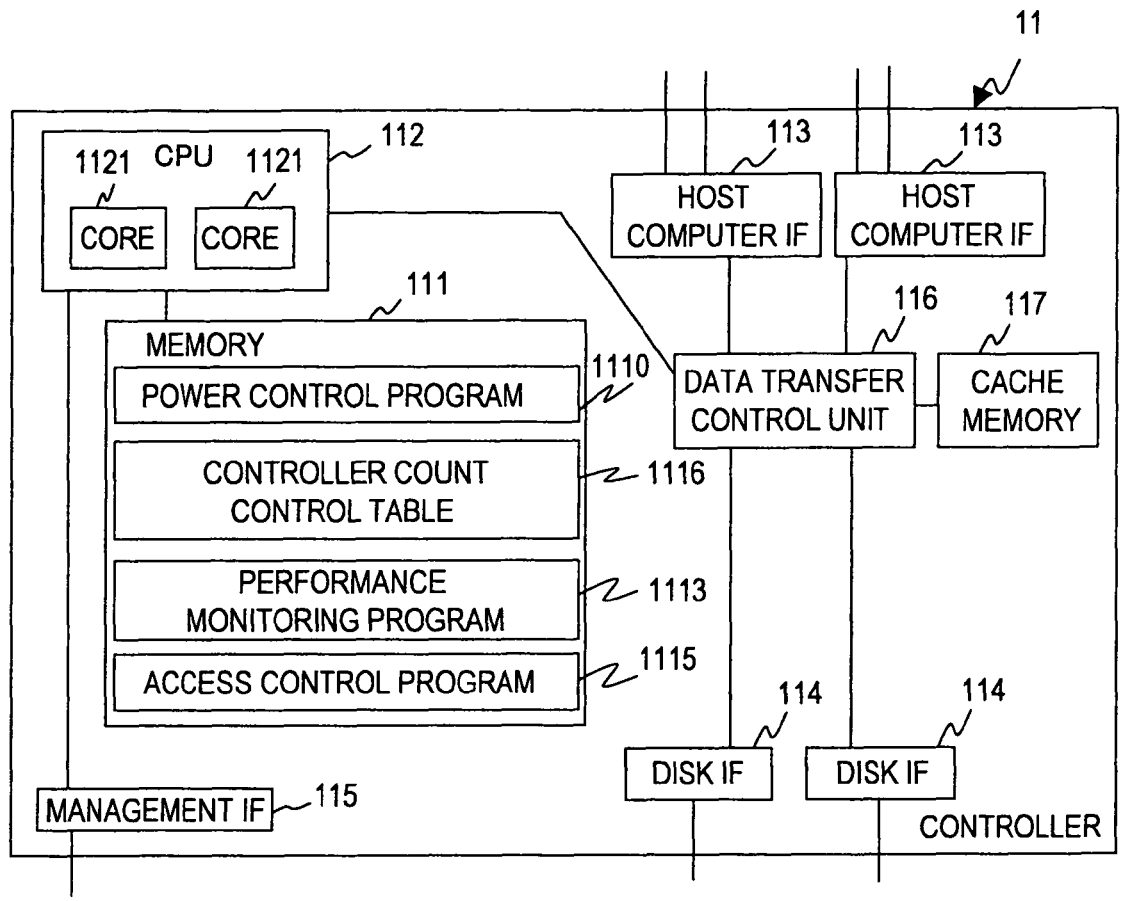
FIG. 7 is a block diagram of a controller of a storage system according to a second embodiment of this invention.

FIG. 7 is a block diagram of the controller 11 of the storage system 1 according to the second embodiment of this invention.

The controller 11 of this embodiment is the same as the controller of the first embodiment shown in FIG. 2, except information stored in the memory 111. The common components are denoted by the same reference symbols to avoid repeating the description.

The memory 111 stores the power control program 1110, a controller count control table 1116, the performance monitoring program 1113, and the access control program 1115.

The power control program 1110, the performance monitoring program 1113, and the access control program 1115 are the same as those stored in the memory 111 of the controller 11 according to the first embodiment, and therefore descriptions thereof will be omitted here.

The controller count control table 1116 manages, as will be described later with reference to FIG. 8, the association between the magnitude of the load applied to the controller 11 and how many controllers 11 are operating.

FIG. 8 is a configuration diagram of the controller count control table 1116 in the controller 11 according to the second embodiment of this invention.

The controller count control table 1116 includes an operating controller count 1116A and operation conditions 1116B. This configuration diagram of the controller count control table 1116 shows a case in which the storage system 1 has four controllers 11.

The operating controller count 1116A indicates how many controllers 11 which are operating in a situation that is represented by a record entry in question. The operation conditions 1116B describe conditions that have to be fulfilled to create the situation represented by this record entry. Specifically, the magnitude of the load applied to the storage system 1 and the like are stored as the operation conditions 1116B.

In this configuration diagram of the controller count control table 1116, conditions related to random performance and sequential performance are stored as the operation conditions 1116B.

Random performance is expressed by the proportion of the current IOPS (I/O per second) of the storage system 1 to the maximum IOPS of the storage system 1. The IOPS of the storage system 1 is the combined IOPS of all controllers 11 provided in the storage system 1.

Sequential performance is expressed by the proportion of the current data processing rate of the storage system 1 to the maximum data processing rate of the storage system 1. The data processing rate of the storage system 1 is the combined data transfer rate of all controller 11 provided in the storage system 1.

Stored as the operation conditions 1116B may be one or plural conditions. In the case where plural conditions are stored as the operation conditions 1116B, the power control program 1110 extracts, for each of the conditions stored as the operation conditions 1116B, a corresponding operating controller count 1116A. The power control program 1110 then chooses the largest one out of the operating controller counts extracted as the operating controller count 1116A. The chosen largest count serves as the operating controller count.

Figure 9:
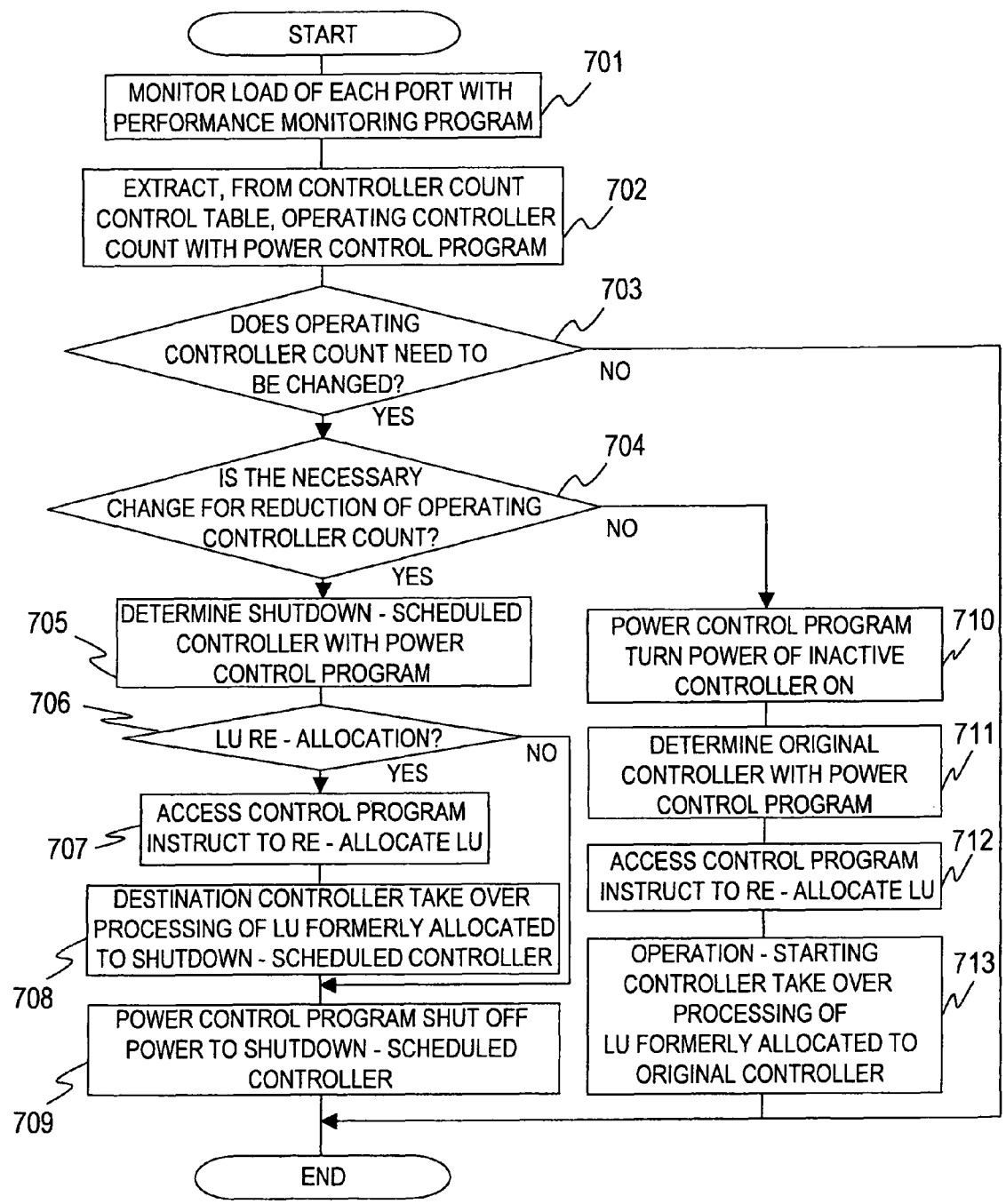
FIG. 9 is a flow chart for operating controller count changing processing according to the second embodiment of this invention.

FIG. 9 is a flow chart for operating controller count changing processing according to the second embodiment of this invention.

The controller 11 periodically performs the operating controller count changing processing.

First, the performance monitoring program 1113 periodically measures the load of the storage system 1 (Step 701). Specifically, the performance monitoring program 1113 measures loads listed as the operation conditions 1116B in the controller count control table 1116.

Then, the power control program 1110 chooses from the controller count control table 1116 a record entry whose operation conditions 1116B match the results of the measurement by the performance monitoring program 1113. From the chosen record entry, the operating controller count 1116A is extracted (Step 702).

The power control program 1110 compares the extracted operating controller count 1116A with the count of the controllers 11 which are currently in operation, to thereby judge whether or not it is necessary to change the current count of the operating controllers 11 (Step 703).

Judging that there is no need to change the current count of the operating controllers 11, the power control program 1110 ends the operating controller count changing processing.

On the other hand, when it is judged that the current count of the operating controllers 11 has to be changed, the power control program 1110 judges whether or not it is necessary to reduce the count of the operating controllers 11 (Step 704).

When it is judged that the current count of the operating controllers 11 needs to be reduced, the power control program 1110 determines which of the operating controllers 11 is to stop operating (Step 705). Specifically, the power control program 1110 chooses, from among the operating controllers 11, one where the load is small. The chosen controller 11 is referred to as shutdown-scheduled controller. A shutdown-scheduled controller is the controller 11 that is planned to stop operating.

The power control program 1110 then judges whether allocation of the LUs 12 needs to be changed or not (Step 706). Specifically, a change of allocation of the LUs 12 is judged as necessary when there are any LUs 12 which are allocated to the shutdown-scheduled controller 11. In the case where no LUs 12 are allocated to the shutdown-scheduled controller 11, it is judged that change of allocation of the LUs 12 is not necessary.

In the case where a change of allocation of the LUs 12 is unnecessary, there is no need to perform processing for changing allocation of the LUs 12. The power control program 1110 therefore advances directly to Step 709.

On the other hand, when allocation of the LUs 12 has to be changed, the power control program 1110 determines which of the operating controllers 11 the LUs 12 are to be re-allocated. Specifically, the power control program 1110 chooses the controller 11 where the load is small from among the operating controllers 11 excluding the shutdown-scheduled controller. The thus chosen controller is referred to as destination controller. A destination controller is the controller 11 that takes over processing of the LUs 12 formerly allocated to the shutdown-scheduled controller.

Next, the access control program 1115 instructs the shutdown-scheduled controller and the destination controller, which are determined by the power control program 1110, to re-allocate the LUs 12 (Step 707). Specifically, the access control program 1115 gives an instruction to allocate the LUs 12 that have been allocated to the shutdown-scheduled controller to the destination controller.

Receiving the instruction, the destination controller takes over processing of the LUs 12 formerly allocated to the shutdown-scheduled controller (Step 708).

Specifics of the processing vary depending on whether or not all controllers 11 in the storage system 1 share the memory 111 and the cache memory 117.

A case in which the memory 111 and the cache memory 117 are shared among all the controllers 11 will be described first.

In this case, the shared cache memory stores user data that have not been destaged to the LUs 12. The shared memory stores configuration information or the like of the LUs 12. Thus, the destination controller consults the configuration information of the LUs 12 which is stored in the shared memory, and controls the LUs 12 of which processing it has taken over. The destination controller destages the user data that is stored in the shared cache memory and is yet to be destaged to the LUs 12 of which processing it has taken over.

Meanwhile, the shutdown-scheduled controller rejects a request to access the formerly allocated LUs 12, and stops managing the formerly allocated LUs 12. Then, a path switching program switches access paths connecting the host computer 2 to the storage system 1. Note that the path switching program is a program that makes an appropriate switch of access paths upon detection of a change of allocation of the LUs 12. The path switching program is provided in, for example, a switch on the network or the host computer 2.

A case in which the controllers 11 do not share the memory and the cache memory will be described next.

In this case, each controller 11 stores, in the cache memory 117, user data that have not been destaged to its allocated LUs 12. Also, each controller 11 stores configuration information of its allocated LUs 12 and the like in the memory 111.

First, the shutdown-scheduled controller destages the user data that are stored in its own cache memory 117 and yet to be destaged to the LUs 12. During this destaging processing, every write access to the LUs 12 allocated to the shutdown-scheduled controller is write-through. This enables the shutdown-scheduled controller to destage all user data stored in the cache memory 117 to the LUs 12, and the data consistency of the LUs 12 is thus achieved. The shutdown-scheduled controller then writes the configuration information of the LUs 12 which is stored in its own memory 111 at given locations in these LUs 12.

Next, the destination controller obtains, from given locations of the LUs 12 of which processing it has taken over, the configuration information of these LUs 12. The obtained configuration information is stored in the memory 111 of the destination controller. Based on the configuration information of the LUs 12 which is stored in the memory 111, the destination controller controls these LUs 12.

Then, a path switching program switches access connecting from the host computer 2 to the storage system 1. The path switching program is a program that makes an appropriate switch of access paths upon detection of a change of allocation of the LUs 12. The path switching program is provided in, for example, a switch on the network or the host computer 2.

The destination controller thus takes over processing of the LUs 12 formerly allocated to the shutdown-scheduled controller.

The power control program 1110 then shuts off power to the shutdown-scheduled controller (Step 709), whereby ending the operating controller count changing processing.

On the other hand, when it is judged in Step 704 that the current count of the operating controller 11 has to be increased, the power control program 1110 determines which of the controllers 11 that are not in operation is to start operating. Then, the power control program 1110 turns on the power of the controller chosen to start operating (operation-starting controller) (Step 710).

The power control program 1110 next balances the load of the operating controllers 11.

Specifically, the power control program 1110 determines from which controller the LUs 12 are to be re-allocated (Step 711). The controller 11 formerly assigned to the LUs 12 that are handed over to the operation-starting controller to be processed is referred to as an original controller. For instance, the power control program 1110 chooses the controller 11 with the largest load out of the operating controllers 11, and decides the thus chosen controller as the original controller.

Next, the access control program 1115 instructs the operation-starting controller and the original controller to re-allocate the LUs 12 (Step 712). Specifically, an instruction is given of allocating the LUs 12 formerly allocated to the original controller to the operation-starting controller.

Receiving the instruction, the operation-starting controller takes over processing of the LUs 12 formerly allocated to the original controller (Step 713). The power control program 1110 then ends the operating controller count changing processing.

After finishing the operating controller count changing processing, the power control program 1110 may immediately start the power saving mode switching processing of the first embodiment which is shown in FIG. 6.

As has been described, the storage system 1 of this embodiment changes the current count of the controllers 11 that are in operation in accordance with the magnitude of the load, and thus reduces power consumption.

Third Embodiment

In a third embodiment, the host computer 2 tells the storage system 1 in which power saving mode is to be employed by the controller 11.

Figure 10:
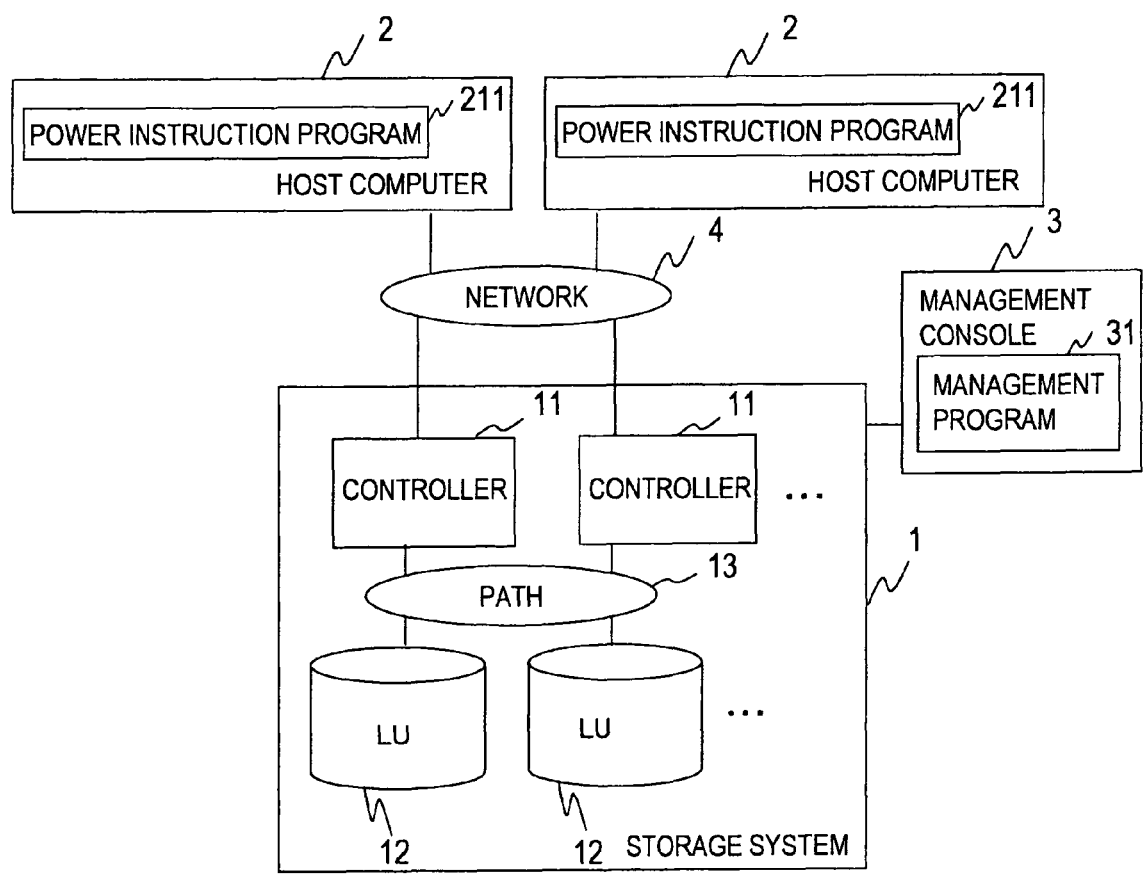
FIG. 10 is a block diagram of a computer system according to a third embodiment of this invention.

FIG. 10 is a block diagram of a computer system according to the third embodiment of this invention.

The computer system of the third embodiment is the same as the computer system of the first embodiment shown in FIG. 1, except the configuration of the host computer 2. The common components are denoted by the same reference symbols to avoid repeating the description.

The host computer 2 in this embodiment stores in its memory a power instruction program 211. The power instruction program 211 is a program that instructs the storage system 1 to switch one power saving mode of the controller 11 to another. The power instruction program 211 may tell the storage system how many controllers 11 are to be put into operation.

The power instruction program 211 may be stored in a memory of the management console 3 instead of the memory of the host computer 2. In this case, the management console 3 tells the storage system 1 in which power saving mode is to be employed by the controller 11.

When given conditions are met, the power instruction program 211 instructs the controller 11 to switch from the current power saving mode. For instance, when the host computer 2 activates or shuts down an application, the power instruction program 211 creates a power saving mode switching request.

Figure 11:
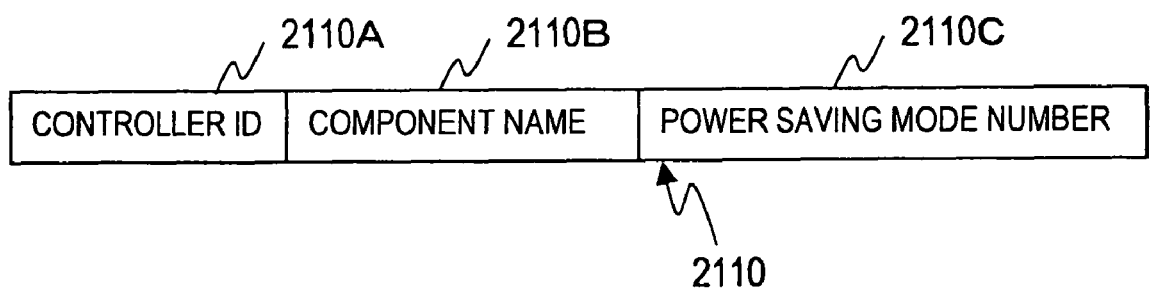
FIG. 11 is a configuration diagram of a power saving mode switching request, which is sent by a power instruction program according to the third embodiment of this invention.

FIG. 11 is a configuration diagram of a power saving mode switching request 2110, which is sent by the power instruction program 211 according to the third embodiment of this invention.

The power saving mode switching request 2110 includes a controller ID 2110A, a component name 2110B, and a power saving mode number 2110C.

The controller ID 2110A indicates an identifier unique to each controller 11. The component name 2110B indicates an identifier unique to each component of the controller 11 that is identified by the controller ID 2110A. The power saving mode number 2110C indicates an identifier unique to each power saving mode of this controller 11.

The power instruction program 211 determines, based on, for example, the type of an application activated or shut down by the host computer 2, which controller needs switching of power saving modes, which of the components of this controller is to switch from the current power saving mode, and the number of the power saving mode after the switch is made.

The power instruction program 211 then enters, in the power saving mode switching request 2110, the identifier of the determined controller as the controller ID 2110A, the identifier of the determined component as the component name 2110B, and the number of the power saving mode after the switch is made determined to replace the current power saving mode as the power saving mode number 2110C.

The power instruction program 211 can instruct every component of the controller 11 to switch power saving modes by leaving the field for the component name 2110B blank.

The power instruction program 211 sends the created power saving mode switching request 2110 to the controller 11.

Receiving the power saving mode switching request 2110, the controller 11 activates the power control program 1110.

The power control program 1110 extracts the component name 2110B and the power saving mode number 2110C from the power saving mode switching request 2110. Then, the power control program 1110 chooses, from the mode management table 1111, a record entry whose power saving mode number 1111A matches the extracted power saving mode number 2110C. From the chosen record entry, the operation details 1111B are extracted. The power control program 1110 gives instructions according to the extracted operation details 1111B to the component that is identified by the extracted component name 2110B.

Receiving the instructions, the component of the controller 11 performs processing corresponding to the operation details 1111B.

The power instruction program 211 may include an operating controller count changing request in the power saving mode switching request 2110.

In this case, the controller 11 that has received the power saving mode switching request 2110 performs the processing of Steps 704 to 713 of the operating controller count changing processing shown in FIG. 9.

The power control program 1110 thus puts as many controllers 11 as requested by the power instruction program 211 of the host computer 2 into operation.

According to this embodiment, the host computer 2 can instruct the controller 11 to switch power saving modes in response to activation or shutdown of application programs. Furthermore, the host computer 2 can instruct to change the count of the operating controllers 11 in response to activation or shutdown of application programs.

Fourth Embodiment

Figure 12:
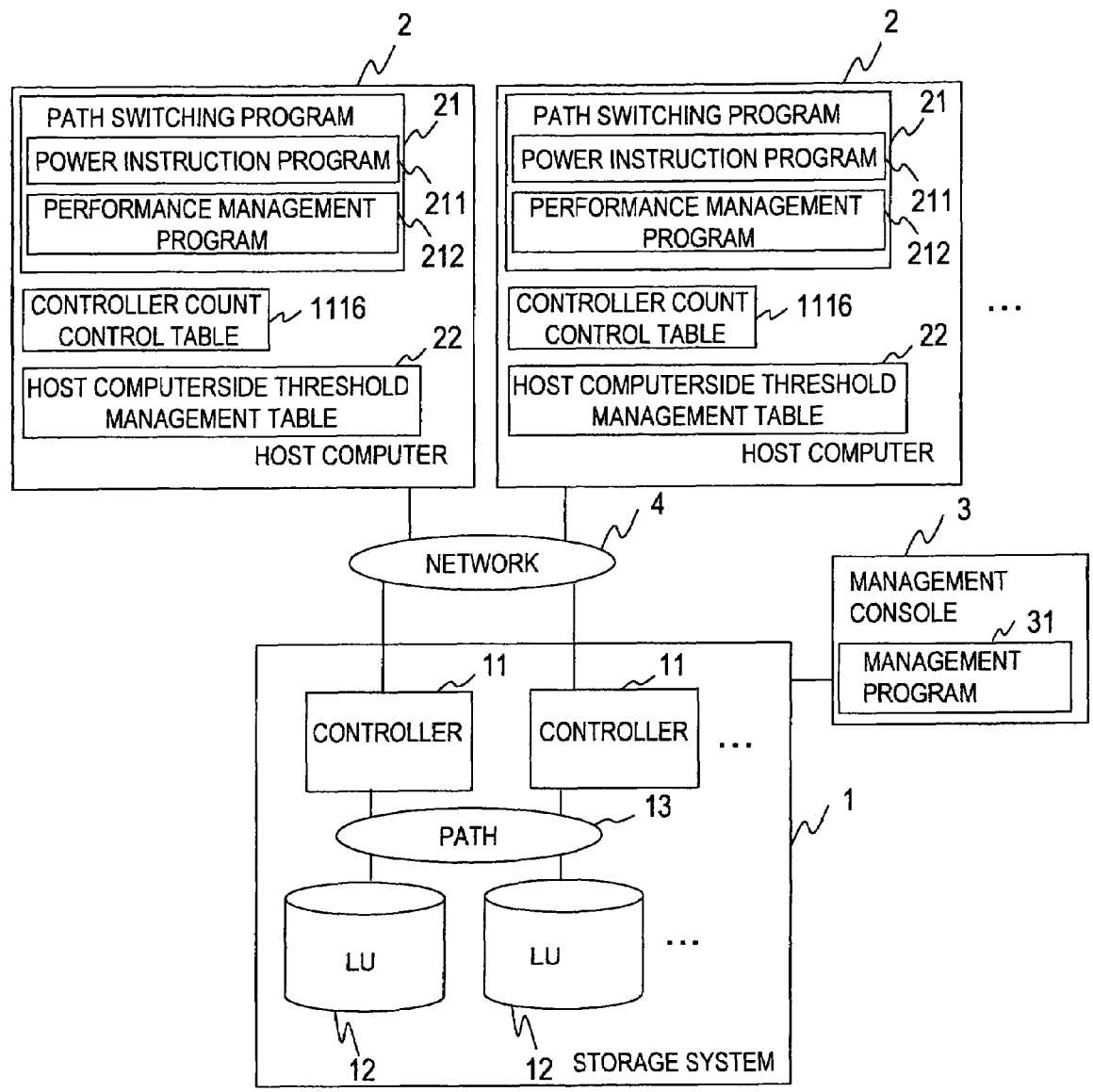
FIG. 12 is a block diagram of a computer system according to a fourth embodiment of this invention.

FIG. 12 is a block diagram of a computer system according to a fourth embodiment of this invention.

The computer system of the fourth embodiment is the same as the computer system of the first embodiment shown in FIG. 1, except the configuration of the host computer 2. The common components are denoted by the same reference symbols to avoid repeating the description.

The host computer 2 in this embodiment stores in its memory a path switching program 21, the controller count control table 1116, and a host computer side threshold management table 22.

The path switching program 21 is a program that controls an access path between the host computer 2 and the storage system 1. The path switching program 21 includes the power instruction program 211 and a performance management program 212.

The power instruction program 211 is a program that tells the storage system 1 which power saving mode is to be employed by the controller 11. The power instruction program 211 may tell the storage system how many controllers 11 are to be put into operation. The performance management program 212 is a program that manages the load of an access path between the host computer 2 and the storage system 1.

The controller count control table 1116 in this embodiment is the same as the controller count control table that is shown in FIG. 8 and stored is the control 11 of the second embodiment. A description on the controller count control table 1116 is therefore omitted here.

The host computer side threshold management table 22 manages, as will be described later with reference to FIG. 13, the association between the magnitude of the load applied to the controller 11 and a power saving mode of the controller 11.

FIG. 13 is a configuration diagram of the host computer side threshold management table 22 in the host computer 2 according to the fourth embodiment of this invention.

The host computer side threshold management table 22 includes a power saving mode number 22A and operation conditions 22B.

The power saving mode number 22A indicates an identifier unique to each power saving mode of the controller 11. The operation conditions 22B describe conditions met in the power saving mode that is identified by the power saving mode number 22A. Specifically, the magnitude of the load applied to the controller 11 and the like are stored as the operation conditions 22B.

In this configuration diagram of the host computer side threshold management table 22, conditions related to random performance and sequential performance are stored as the operation conditions 22B.

Random performance is expressed by the proportion of the current IOPS of the controller 11 to the maximum IOPS of the controller 11. Sequential performance is expressed by the proportion of the current data processing rate of the controller 11 to the maximum data processing rate of the controller 11.

Stored as the operation conditions 22B may be one condition or plural conditions. In the case where plural conditions are stored as the operation conditions 22B, the power instruction program 211 extracts, for each of the conditions stored as the operation conditions 22B, a corresponding power saving mode number 22A. The power instruction program 211 then chooses the smallest one out of the power saving mode numbers extracted as the power saving mode number 22A. The smallest number chosen serves as the power saving mode number of the controller 11.

Described next is power saving mode switching processing of the computer system according to this embodiment.

The performance management program 212 of the host computer 2 periodically measures the load of an access path from the host computer 2 to the storage system 1.

Based on the load of the access path measured by the performance management program 212, the power instruction program 211 calculates the load of each controller 11.

The power instruction program 211 then chooses, from the host computer side threshold management table 22, a record entry whose operation conditions 22B match the calculated load. From the record entry chosen, the power saving mode number 22A is extracted.

The extracted power saving mode number 22A is compared against a power saving mode number that is currently set to the controller 11, to thereby judge whether or not the power saving mode set to the controller 11 needs to be switched to another power saving mode.

When it is judged that a switch from the current power saving mode has to be made, the power instruction program 211 sends, to the controller 11, the power saving mode switching request 2110 that includes the extracted power saving mode number 22A.

Receiving the power saving mode switching request 2110, the controller 11 activates the power control program 1110 to switch the current power saving mode to another power saving mode.

The host computer 2 of this embodiment thus instructs the controller 11 to switch power saving modes in accordance with the magnitude of the load applied to an access path between the host computer 2 and the storage system 1.

Figure 14:
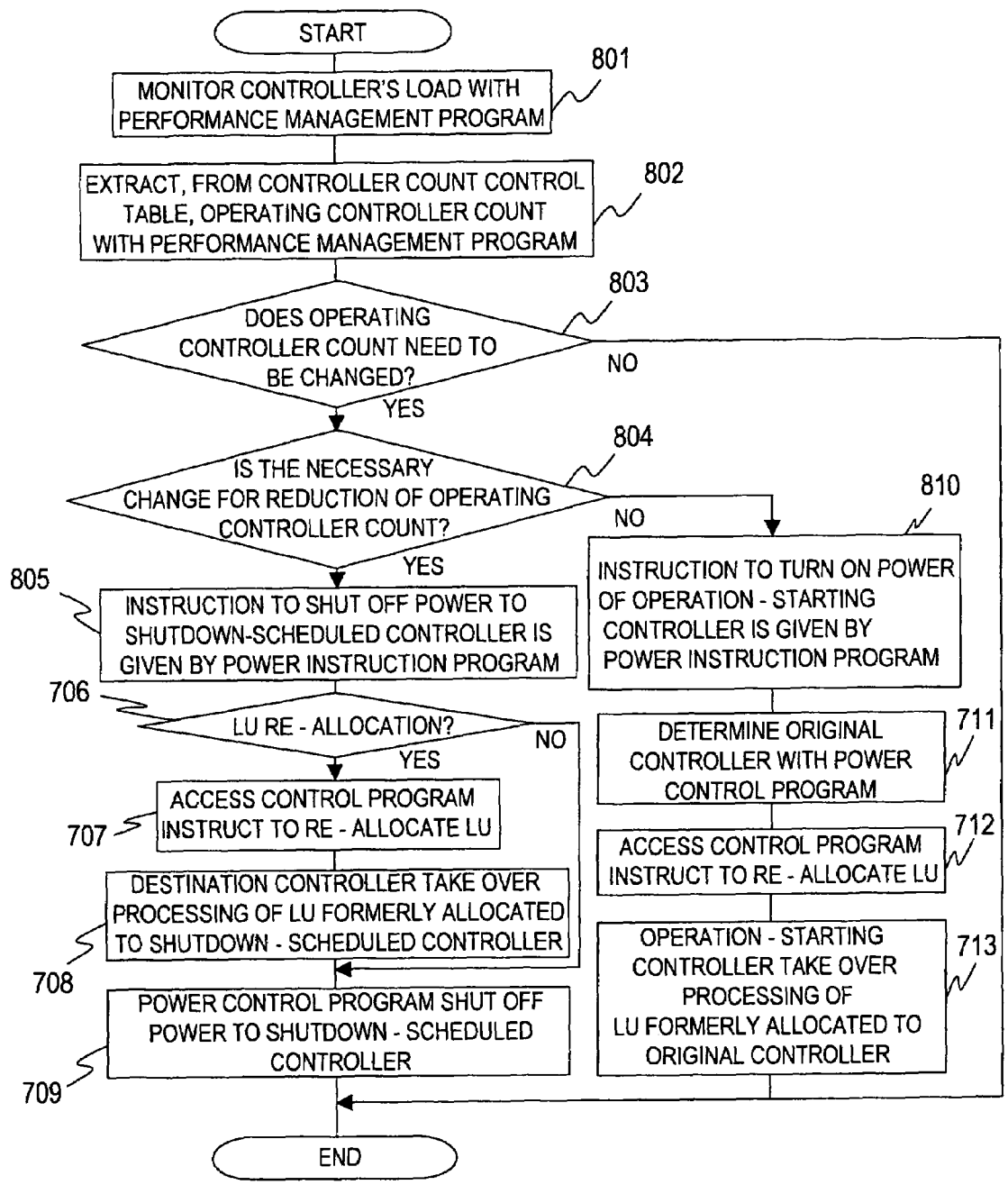
FIG. 14 is a flow chart for operating controller count changing processing according to the fourth embodiment of this invention.

FIG. 14 is a flow chart for operating controller count changing processing according to the fourth embodiment of this invention.

The performance management program 212 of the host computer 2 periodically measures the load of each access path from the host computer 2 to the storage system 1 (Step 801).

Based on the load of the access path measured by the performance management program 212, the power instruction program 211 of the host computer 2 calculates the load of each controller 11.

The power instruction program 211 then chooses, from the controller count control table 1116, a record entry whose operation conditions 1116B match the calculated load. From the record entry chosen, the power saving mode number 1116A is extracted (Step 802).

The power instruction program 211 compares the extracted operating controller count 1116A against the count of the controllers 11 that are currently in operation, to thereby judge whether or not it is necessary to change the current count of the operating controllers 11 (Step 803).

Judging that there is no need to change the current count of the operating controllers 11, the power instruction program 211 ends the operating controller count changing processing.

On the other hand, when it is judged that the current count of the operating controllers 11 has to be changed, the power instruction program 211 judges whether the necessary change is for reduction of the count of the operating controllers 11 or not (Step 804).

When it is judged that the current count of the operating controllers 11 needs to be reduced, the power instruction program 211 determines which of the operating controllers 11 is to stop operating (Step 805). Specifically, the power instruction program 211 chooses, from among the operating controllers 11, one where the load is small. The chosen controller 11 is referred to as shutdown-scheduled controller. A shutdown-scheduled controller is the controller 11 that is planned to stop operating.

The power instruction program 211 next instructs the shutdown-scheduled controller to turn off the power. In response to the instruction, the shutdown-scheduled controller activates the power control program 1110 and the access control program 1115. The power control program 1110 and the access control program 1115 perform the processing of Steps 706 to 709 of the operating controller count changing processing described in the second embodiment with reference to FIG. 9. Then the operating controller count changing processing is ended.

On the other hand, when it is judged in Step 804 that the current count of the operating controller 11 has to be increased, the power instruction program 211 determines which of the controllers 11 that are not in operation is to start operating. Then the power instruction program 211 instructs the thus chosen controller (operation-starting controller) to turn on the power (Step 810).

Receiving the instruction to turn the power on, the operation-starting controller turns on the power, and activates the power control program 1110 and the access control program 1115.

The power control program 1110 and the access control program 1115 perform the processing of Steps 711 to 713 of the operating controller count changing processing described in the second embodiment with reference to FIG. 9. Then the operating controller count changing processing is ended.

According to this embodiment, the host computer 2 instructs to change the count of the operating controllers 11 in accordance with the load of an access path between the host computer 2 and the storage system 1. The storage system 1 can thus reduce power consumption.

While the present invention has been described in detail and pictorially in the accompanying drawings, the present invention is not limited to such detail but covers various obvious modifications and equivalent arrangements, which fall within the purview of the appended claims.

What is claimed is:

1. A method of saving power consumed by a storage system that is connected to a host computer via a network, wherein the storage system has a disk device for storing data based upon a request by the host computer, and plural controllers including at least a first controller and a second controller, each of which controls access to the disk device, wherein the controllers each have an interface connected to the network, a processor connected to the interface, and a memory connected to the processor, wherein the memory stores controller count control information, which indicates the association between the load of the storage system and the count of operating controllers, wherein the host computer recognizes a storage area of the disk device on a logical storage area basis, the storage area including a first logical unit accessed by the first controller and a second logical unit accessed by the second controller, wherein one of the processors measures a load of the storage system, wherein the one of the processors controls power to the controllers in accordance with the measured load of the storage system, wherein, based on the controller count control information and the measured load of the storage system, the one of the processors determines the number of controllers that are to be put into operation, wherein the one of the processors controls power to the controllers in a manner that puts the determined number of controllers into operation, and wherein, prior to turning off power to the first controller, the one of the processors allocates the first logical unit allocated to the first controller to the second controller.

2. The method of saving power consumed by a storage system according to claim 1, wherein the one of the processors controls power to the controllers in accordance with an instruction given from the host computer.

3. The method of saving power consumed by a storage system according to claim 1,
wherein the memory stores mode management information, which indicates the association between the load of the storage system and an operation mode of the controllers, and
wherein, based on the measured load and the mode management information, the one of the processors determines which operation mode is to be employed by the controllers.

4. The method of saving power consumed by a storage system according to claim 3, wherein one operation mode differs from other operation modes in at least one of drive frequency of the processors, count of operating processors, and count of cores that are operating in each processor.

5. A method of saving power consumed by a storage system that is connected to a host computer via a network,
wherein the storage system has a disk device for storing data based upon a request by the host computer, and plural controllers including at least a first controller and a second controller, each of which control access to the disk device,
wherein the controllers each have an interface connected to the network, a processor connected to the interface, and a memory connected to the processor,
wherein the memory stores mode management information, which indicates the association between a load of the storage system and an operation mode of the first controller,
wherein the host computer recognizes a storage area of the disk device on a logical storage area basis, the storage area including a first logical unit accessed by the first controller and a second logical unit accessed by the second controller, wherein one of the processors measures the load of the storage system, and
wherein, based on the measured load and the mode management information, the one of the processors determines which operation mode is to be employed by the first controller and the second controller;
wherein if the operation mode to be employed by the first controller indicates that power is to be turned off for the first controller, the one of the processors allocates the first logical unit to the second controller before turning off power to the first controller.

6. The method of saving power consumed by a storage system according to claim 5, wherein one operation mode differs from another operation mode in at least one of drive frequency of the processors, count of operating processors, and count of cores that are operating in each processor.

7. The method of saving power consumed by a storage system according to claim 5, wherein the load of the storage system includes at least one of an activity ratio of the processors, an activity ratio of the interface, and a data transfer rate of the controllers.

8. A storage system accessed by a host computer, comprising:
a disk device to store data based upon a request by the host computer; and
plural controllers including at least a first controller and a second controller, each of which controls access to the disk device,
wherein the controllers each have:
a measuring unit which measures a load of the storage system; and
a power control unit which controls power to the controllers in accordance with the load of the storage system measured by the measuring unit
wherein the controllers stores controller count control information, which indicates the association between the load of the storage system and the count of operating controllers,
wherein, based on the controller count control information and the load of the storage system measured by the measuring unit, the power control unit determines the number of controllers that are to be put into operation,
wherein the power control unit controls power to the controllers in a manner that puts the determined number of controllers into operation;
wherein the host computer recognizes a storage area of the disk device on a logical storage area basis, the storage area including a first logical unit accessed by the first controller and a second logical unit accessed by the second controller,
wherein each controller has an access control unit which controls allocation of the logical storage area, and
wherein, prior to shutting off power to one of the controllers, the access control unit of the first controller allocates the first logical unit to the second controller.

9. The storage system according to claim 8, wherein the power control unit controls power to the controllers in accordance with an instruction given by the host computer.

10. The storage system according to claim 8, wherein the load of the storage system includes at least one of an activity ratio of the processors, an activity ratio of the interface, and a data transfer rate of the controllers.

11. The storage system according to claim 8,
wherein the controllers store mode management information, which indicates the association between the load of the storage system and an operation mode of the controllers, and
wherein, based on the measured load and the mode management information, the power control unit determines which operation mode is to be employed by the controllers.

12. The storage system according to claim 11, wherein one operation mode differs from other operation modes in at least one of drive frequency of the controller, count of operating controllers, and count of cores that are operating in each controller.

* * * * *